United States Patent [19]
Fish

[11] Patent Number: 6,157,021
[45] Date of Patent: Dec. 5, 2000

[54] ACTIVE REGULATOR FOR IMAGE INTENSIFIER POWER SUPPLY

[75] Inventor: Franklin H. Fish, Indianapolis, Ind.

[73] Assignee: The United States of America as represented by the Secretary of the Navy, Washington, D.C.

[21] Appl. No.: 09/183,960

[22] Filed: Nov. 2, 1998

[51] Int. Cl.[7] .................................................. H01J 31/50
[52] U.S. Cl. .............................. 250/214 VT; 250/214 R; 250/207
[58] Field of Search ............................. 250/207, 214 VT, 250/214 LA, 214 R; 313/532, 537, 103 R, 103 CM, 104, 105, 105 CM; 323/265, 291, 292, 304, 311

[56] References Cited

U.S. PATENT DOCUMENTS

| | | | |
|---|---|---|---|
| 4,166,213 | 8/1979 | Hoover | 250/214 VT |
| 4,734,573 | 3/1988 | Dill | 250/214 VT |
| 5,495,364 | 2/1996 | Palmer | 250/214 VT |
| 5,883,381 | 3/1999 | Saldana | 250/214 VT |
| 5,949,063 | 9/1999 | Saldana et al. | 250/214 VT |

*Primary Examiner*—John R Lee
*Attorney, Agent, or Firm*—Ron Billi

[57] ABSTRACT

An active regulator that reduces the noise occurring on an image intensifier tube particularly suited for use in night vision system is disclosed. The active regulator reduces the noise thereof and increases the sensitivity of the night vision system.

6 Claims, 10 Drawing Sheets

ACTIVE REGULATOR FOR IMAGE INTENSIFIER POWER SUPPLY

STATEMENT OF GOVERNMENT INTEREST

This invention described herein may be manufactured and used by or for the Government of the United States of America for governmental purposes without the payment of any royalties thereon or therefor.

BACKGROUND OF THE INVENTION

The present invention is related to an image intensifier tube (IIT) system particularly suited for night vision and, more particularly, to an IIT system having a cathode switch for an IIT system having reduced power consumption and reduced noise generated by high voltage switching.

Image intensifier tubes that operatively cooperate with high voltage power supplies so as to form a night vision system having light amplification are known. Although these image intensifier tubes serve well their intended purpose they are sometimes plagued by the occurrence of noise generated by the high voltage power supply which is reflected in the inability to operate at low input light levels and, thus, limiting the sensitivity of the night vision system. It is known that high voltage filter capacitors can be used to reduce the unwanted noise but these high voltage filter capacitors have an attendant drawback of size and cost. It is desired that means be provided for eliminating the need of large high voltage capacitors, but still eliminating the undesired noise that lowers the sensitivity of the night vision system that employs the image intensifier tube.

SUMMARY OF THE INVENTION

The present invention is directed to a night vision system employing an imager intensifier tube but also having means to reduce the noise generated by the associated high voltage power supply and, thus, improve the sensitivity of the night vision system.

The vision system comprises an image intensified tube having four terminals and comprising a photocathode having a first terminal at one of its ends; a micro channel plate having second and third terminals at one of its ends; and an anode having a fourth terminal at one of its ends. The vision system further comprises a high voltage power supply comprising a cathode switch having a common and a control terminal. The common has one end connected to the first terminal and its other end switchable between ON and OFF positions in response to a first electrical signal applied to its control terminal. The cathode supply comprises a positive power source and a negative power source each having positive and negative terminals with the positive terminal of the positive power connected to the OFF position of the cathode switch and the negative terminal of the negative power source connected to the ON position of the cathode switch. The negative terminal of the positive power source being connected to both the positive terminal of the negative power source and to the second terminal of said micro channel plate. The high voltage power supply further comprises a micro channel plate voltage multiplier having positive, negative and adjustable terminals and developing both a d-c voltage and a voltage having an ac component with instantaneous amplitude and phase between its positive and negative terminals in response to a second electrical signal applied to its adjustable terminal. The micro channel plate multiplier has an output voltage of about 350 V DC to about 950 V DC with a relatively small amount of ripple of approximately 3 V peak-to-peak. The negative terminal is connected to the second terminal of the micro channel plate and the positive terminal is connected to the third terminal of said micro channel plate. The high voltage system further comprises an exposure control circuit having control (cont), micro channel plate (MCP), gate, and input (in) terminals. The (cont) terminal thereof is connected to the control terminal of the cathode switch. The (MCP) terminal thereof is connected to the adjustable AC drive voltage terminal of the micro channel plate voltage multiplier, and the (in) terminal thereof is connected to the fourth terminal of the anode terminal of the image intensifier tube. The AC drive voltage may be adjusted from 90 to 500 volts peak-to-peak and generates a corresponding 350 to about 1000 V DC output of the micro channel plate multiplier. The exposure control circuit is responsive to an electrical signal applied on its gate terminal and, in response therefore, generates the first and second electrical signals. The high voltage power supply further comprises a screen voltage multiplier that develops a negative voltage at one of its terminals connected to the third terminal of the micro channel plate. The screen voltage multiplier has a ground terminal as another one of its terminals. The high voltage power supply further comprises an active regulator having a terminal connected to a ground potential, a sense terminal connected to the third terminal of the micro channel plate, and an input (in) terminal connected to the ground potential terminal of the screen voltage multiplier. The active regulator senses the ac component of the micro channel plate voltage multiplier and generates a signal having a corresponding amplitude but in opposite phase thereto so as to effectively cancel the ac component of the micro channel plate voltage multiplier.

Accordingly, it is an object of the present invention to provide an active regulator that reduces or even eliminates the AC noise generated by the high voltage power supply system so as to increase the sensitivity of the IIT night vision system.

Other objects, advantages and novel features of the invention will become apparent from the following detailed description when considered in conjunction with the accompanying drawings therein.

BRIEF DESCRIPTION OF THE DRAWINGS

FIGS. 6–10, including 6, 7(A), 7(B), 8(A), 8(B), 9(A), 9(B), 10(A), and 10(B), illustrate the response characteristics of the present invention obtained during the practice of the present invention.

DETAILED DESCRIPTION OF THE PRESENT INVENTION

Figure 1:
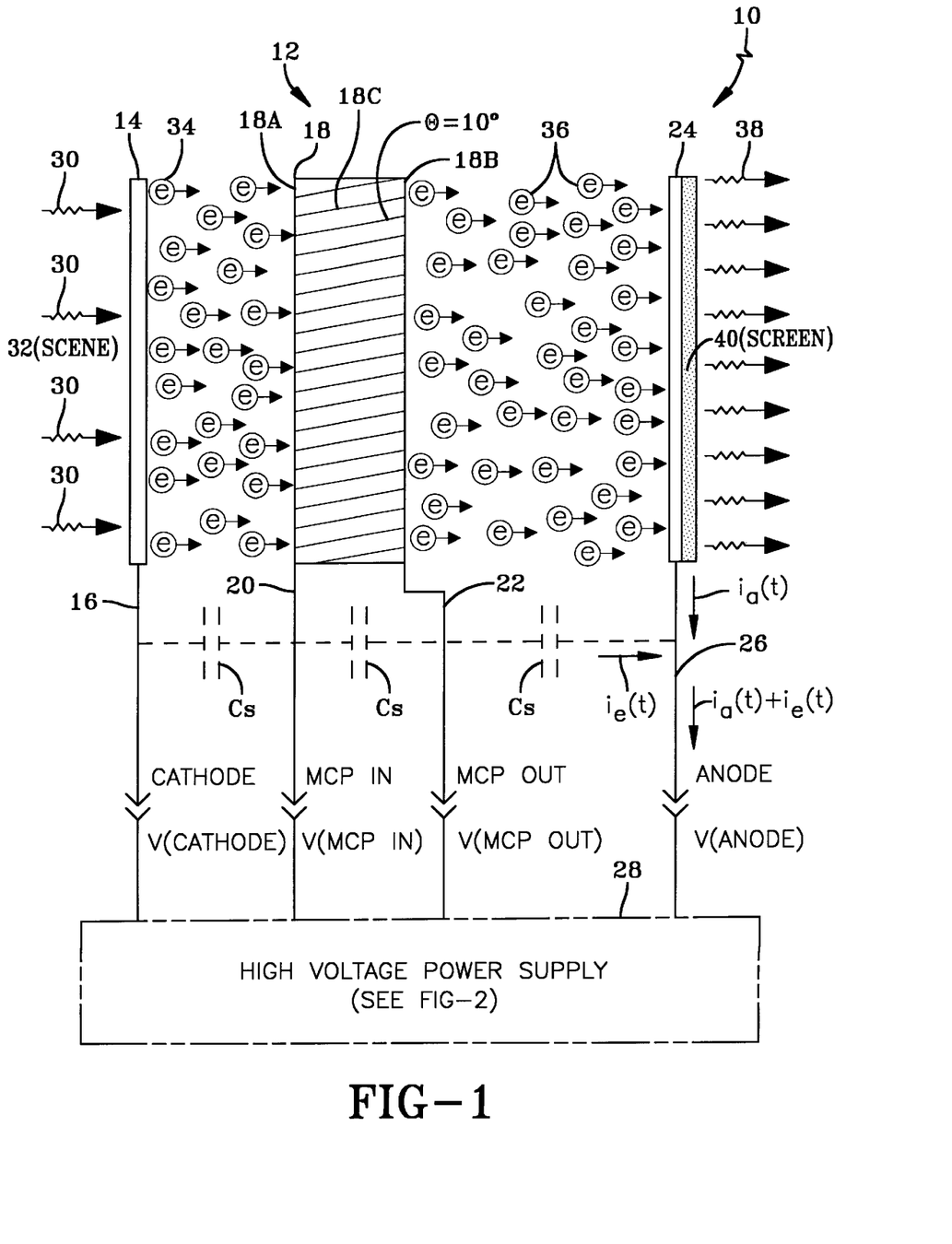
FIG. 1 is a block diagram primarily illustrating the image intensifier tube of the present invention.

With reference to the drawings, wherein the same reference number indicates the same element throughout, there is shown in FIG. 1 a block diagram of the system 10 particularly illustrating an image intensifier tube 12 of the present invention. The image intensifier tube has four terminals and comprises a photocathode 14 having a first terminal 16 at one of its ends, a micro channel plate (MCP) 18 with an entrance or front face 18A and an exit or rear face 18B and having second and third terminals 20 and 22 at one of its ends, and an anode 24 having a fourth terminal 26 at one of its ends. The terminals 16, 20, 22 and 26 extend into the high voltage power supply 28 of FIG. 2. The terminal 16 is further indicated by the terminology CATHODE, v (CATHODE); terminal 20 is indicated by the terminology MCP IN, v (MCP IN); terminal 22 is indicated by the terminology MCP OUT, v (MCP OUT); and terminal 26 is indicated by the terminology ANODE, v (ANODE).

In operation, photons 30, emanating from a scene 32, impinge the photocathode 14 and create electrons 34. If a negative bias is applied between the cathode first terminal 16 and the second terminal 20 (MCP IN), the IIT tube 12 is "on" and the electrons 34 are then accelerated toward the face 18A of the MCP 18. A positive cathode bias voltage applied between the cathode terminal 16 and the second terminal 20, by means of HVPS 28, prevents electrons from reaching the face 18A of the MCP 18 and the IIT tube 12 is "off." The MCP 18 is comprised of an array and functions as an electron multiplier. More particularly, the MCP 18 consists of millions of small, hollow glass tubes bonded together. The length to diameter ratio of the individual tubes of the MCP 18 is approximately 40. Metal electrodes are deposited on both faces 18A and 18B of the MCP 18 array. A voltage applied across the MCP, that is, across terminals 20 and 22 by the HVPS 28, causes a strip current to flow which results in a charge being stored on the inside walls of the hollow glass tubes. The amount of stored charge is directly proportional to the magnitude of the voltage applied across terminals 20 and 22.

As seen in FIG. 1, the glass tubes, shown as boxes, are angled, as shown by angle Θ, at approximately 10 degrees with respect to the axis (not shown) of the IIT tube 12 so that electrons 34 accelerated into the array will strike the tube walls. The electrons 34 striking the tube walls, such as interior surface 18C, of the MCP 18 cause the generation of secondary electrons resulting in electron gain of the MCP 18. A high voltage is also applied between MCP OUT and the screen of the IIT 12, that is, across terminals 22 and 26 causing the electrons 36 which exit the MCP 18 at its face 18B thereof to be accelerated toward the screen 40 which is deposited on the anode and shown as the shaded area. As the electrons 36 strike the anode 24, the electrons 36 are collected as a screen current $i_a(t)$. The screen 40 consists of a phosphor coating which the striking electrons 36 excite resulting in the emission of photons 38. Since the IIT tube 12 is constructed to be spatially coherent, the image at the screen 40 is an amplified recreation of the image at the photocathode, that is, scene 32. The operation of the vision system 10 may be further described with reference to FIG. 2.

Figure 2:
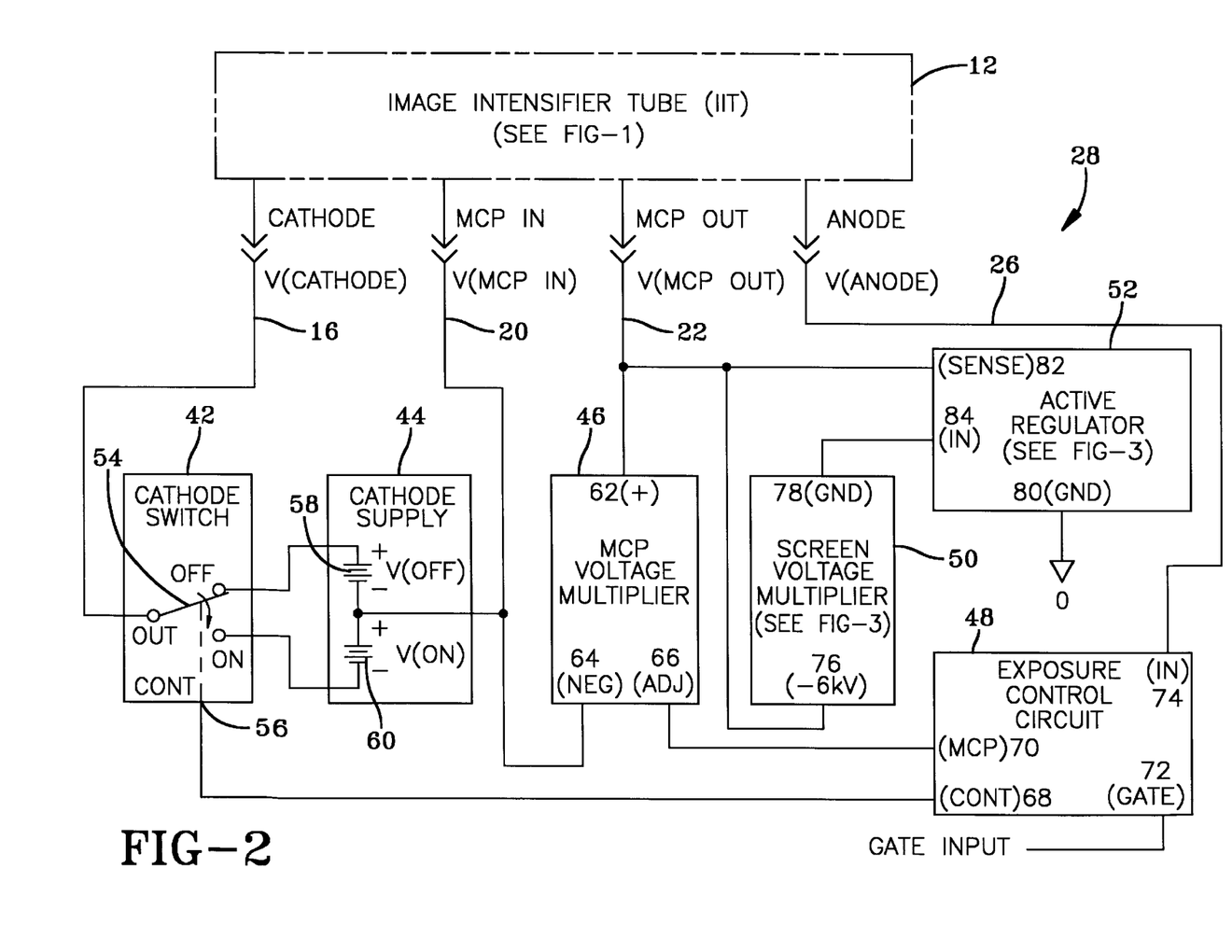
FIG. 2 is a block diagram primarily illustrating the high voltage power supply system of the present invention.

The high voltage power supply 28 comprises a cathode switch 42, a cathode supply 44, a MCP voltage multiplier 46, an exposure control circuit 48, a screen voltage multiplier 50, and an active regulator 52 which is of particular importance to the present invention.

The cathode switch 42 has a common 54 and a control terminal 56. The common 54 has one end connected to the first terminal 16 and its other end switchable between ON and OFF positions in response to a first electrical signal applied to the control terminal 56 and generated by the exposure control circuit 48.

The cathode supply 44 comprises a positive power source and a negative power source 58 and 60, respectively, each having positive and negative terminals with the positive terminal of the positive power source 58 connected to the OFF position of the cathode switch 42 and the negative terminal of the negative power source 60 connected to the ON position of the cathode switch 42. The negative terminal of the positive power source 58 is connected to both the positive terminal of the negative power source 60 and to the second terminal 20 of the micro channel plate 18.

The micro channel plate voltage multiplier 46 has a positive (+) terminal 62, a negative (neg) terminal 64 and an adjustable (adj) terminal 66 and develops a d-c voltage having an ac ripple component with an instantaneous amplitude and phase. The micro channel plate multiplier 46 has an output voltage of about 350 V DC to about 950 V DC with a relatively small amount of ripple of approximately 3 V peak-to-peak. The voltage of micro channel plate voltage multiplier 46 is developed between its positive and negative terminals 62 and 64, respectively, in response to a second electrical signal applied to the adjustable terminal 66 and generated by exposure control circuit 48. The second electrical signal is an AC drive voltage that may be adjusted from 90 to 500 volts peak-to-peak and generates a corresponding 350 to about 1000 V DC output of the micro channel plate multiplier 46. The negative terminal 64 is connected to the second terminal 20 of the micro channel plate 18 and the positive terminal 22 is connected to the third terminal 22 of the micro channel plate 18.

In usage, a single night voltage and day voltage for the micro channel plate voltage multiplier 46 are set during system calibration by adjusting the amplitude of the ac drive signal applied to the micro channel plate (MCP) voltage multiplier 46. Once set, the night and day voltages have a constant d-c value, which can be changed only by re-calibration of the system. During system operation the exposure control, depending on external light conditions, switches between the pre-set night and day values of MCP voltage multiplier.

The exposure control circuit 48 has control (cont) 68, micro channel plate (MCP) 70, gate 72 and input (in) 74 terminals. The (cont) terminal 68 thereof is connected to the control terminal 56 of the cathode switch 42. The (MCP) terminal 70 thereof is connected to the adjustable terminal 66 of the micro channel plate voltage multiplier 46, and the (in) 74 terminal thereof is connected to the fourth terminal 26 of said anode 24. The exposure control circuit is responsive to an electrical signal, indicated in FIG. 2 as GATE INPUT, applied on its gate terminal and, in response therefor, generates the first and second electrical signals respectively applied to the control terminal 56 of the cathode switch 42 and to the adjustable terminal 66 of the MCP voltage multiplier 46.

The screen voltage multiplier 50 develops a negative voltage, having a typical value of about −6,000 volts D.C. and a 5 VPP AC ripple voltage at its terminal 76 that is connected to the third terminal 22 of the micro channel plate 18. The screen voltage multiplier 50 has a ground (GND) potential at another one of its terminals 78 and to which the −6,000 volts D.C. of terminal 76 is referenced.

The active regulator 52 has a terminal 80 designated as ground, a sense terminal 82 connected to the third terminal 22 of the micro channel plate 18, and an (in) terminal 84 connected to the ground terminal 78 of the screen voltage multiplier 50.

As will be further described, the active regulator 52 senses the ac component appearing at the micro channel plate voltage multiplier 46 terminal 62 having an instantaneous amplitude and having an instantaneous phase thereof and generates a signal having a corresponding amplitude but at an opposite phase thereto so as to effectively cancel the ac component appearing at the micro channel plate voltage multiplier terminal 62. This ac component is generated by all the multipliers of the IIT system 10 and coupled by circuit elements and parasitic capacitance to terminal 62.

The HVPS 28 provides the interface control voltages to the IIT 12. The screen voltage multiplier 50 provides a screen voltage which is a fixed d-c voltage which is typically in the range of 5,000 to 6,000 volts referenced to ground. The MCP voltage multiplier 46 supplies a voltage which is a floating d-c source whose positive terminal 62 is referenced to the negative side of the screen supply, that is, the screen voltage multiplier, appearing on terminal 76. The voltage of the MCP voltage multiplier 46 is adjustable, in response to the second signal generated by the exposure control circuit 48, over a range of about 350 to 950 volts and is controlled by the exposure control circuit 48.

The adjustable voltage provided by the MCP voltage multiplier 46 yields a control range that provides for a change in gain of over 1000. The cathode supply 44 is referenced to the negative side, that is terminal 64, of the MCP voltage multiplier 46 and consists of a positive voltage which is used to bias the IIT tube 12 "off," and a negative voltage which turns the IIT tube 12 "on." The "off" voltage is typically 20 volts. The "on" voltage for one embodiment of the IIT system 10 is typically 180 volts, while another embodiment, desires an "on" bias voltage of 800 to 900 volts. The IIT tube 12 is gated at a 60 Hz rate, and the "on" time is varied over a range of 1 to 1000 micro seconds. The gating signal (GATE INPUT) is generated by the timing circuits (not shown) but known in the art, of the IIT system 10 and is applied to the gate input of the exposure control circuit 48.

Referring to FIGS. 1 and 2 simultaneously, the exposure control circuit 48 integrates the current, flowing in the anode 24 and applied to the (in) terminal 74 of the exposure control circuit 48, over time which is equivalent to screen charge, $Q_A$. Since output screen brightness is directly proportional to integrated charge $Q_A$, maintaining a constant screen charge $Q_A$ results in a constant output image brightness. By varying exposure time (by way of the first electrical signal generated by the exposure control circuit 48 and present at terminal 68 thereof), and MCP voltage (by way of the second electrical signal generated by the exposure control circuit 48 and present at terminal 70 thereof), provided by the MCP voltage multiplier 46, the exposure control circuit 48 can achieve an effective dynamic range of over one million to one. This means that for a constant output screen brightness, the input image brightness can vary over a million to one range. The capability is especially useful for a night vision system which is contemplated as one embodiment of the present invention.

In the system 10 of the present invention that may be used for night vision purposes, the MCP output voltage applied on terminal 22 has not only the desired d-c screen voltage component, but also an unwanted ac noise component having an instantaneous amplitude with a corresponding instantaneous phase. This ac noise voltage is caused by many factors, such as ac power supply ripple, digital logic noise, cathode switching noise, circuit elements, parasitic capacitance and other similar sources. The ac noise is conducted to the outputs of the high voltage power supply 28 via internal power supply paths, and IIT parasitic, shown in phantom in FIG. 1 by the capacitors $C_S$. The MCP output voltage ac noise is of particular importance, since, without the benefits of the present invention, could cause a current to flow through the MCP OUT (terminal 22) to anode parasitic tube capacitance $C_S$ and then out the anode lead, that is, onto terminal 26. This ac noise current is shown in FIG. 1 as $i_e(t)$ and adds to the collected electron current, $i_a(t)$, also shown in FIG. 1, and the sum $1_a(t)+1_e(t)$, without the benefits of the present invention, is integrated by the exposure control circuit 48. For reliable operation of the exposure control it is necessary that the ac noise current be a relatively small component of the total anode current and such is provided by the present invention.

AC noise current is nearly constant for a given system implementation, such as system 10 of FIG. 1, whereas output scene brightness is a system adjustment. The lower the output scene brightness is adjusted, the lower the collected screen current becomes. MCP OUT voltage noise, present on terminal 22 and generated by the operative cooperation of the MCP voltage multiplier 46 and the screen voltage multiplier 50, is normally, unlike the present invention, controlled by the use of high voltage filter capacitors, previously discussed in the "Background" section. With optimum filtering a minimum integrated charge level of 150 pC can be achieved. Lowering the output screen brightness allows the prior art system to operate at lower input light levels resulting in greater sensitivity. The prior art solution of increasing the values of the filter capacitors is not practical from a size standpoint, is only marginally effective in reducing noise voltage, and results in excessive stored charge which might represent a safety hazard, or cause damage to the IIT system 10 under arcing conditions.

In general, the present invention without the need of large value high voltage filter capacitors, makes it possible to implement a system 10 which operates at charge levels well below 150 pC. More particularly, the invention provides an active regulator 52 to reduce MCP OUT voltage noise. The active regulator 52 effectively causes the ground lead, that is, the potential at terminal 78 of the screen voltage multiplier 50 to be opened, and the active regulator 52 is inserted between the ground terminal 78 of the screen voltage multiplier 50 and actual ground. The active regulator 52 senses the ac component of the MCP OUT voltage at the terminal 22. The complement of the sensed voltage is then generated by the active regulator 52 and added to the screen voltage, that is, the voltage on terminal 22, thereby effectively nulling or cancelling out the undesired ac noise voltage that would otherwise degrade the sensitivity of the IIT system. The invention, therefore, results in greatly reduced MCP OUT voltage noise while having minimum affect on physical size and stored charge, that is, accomplishes its desired solution without the need of bulky and costly high voltage filter capacitors. The active regulator 52 may be further described with reference to FIG. 3 which comprises a plurality of elements having typically values or being of a type all shown in Table 1.

TABLE 1

| ELEMENTS | TYPICAL VALUE/TYPE |
| --- | --- |
| U1A | Operational Amplifier AD712S/AD |
| R1 | 9.1K |
| R2 | 100K |
| R3 | 1K |
| R4 | 10K |
| R5 | 1K |
| R6 | 11K |
| R7 | 12M |

TABLE 1-continued

| ELEMENTS | TYPICAL VALUE/TYPE |
|---|---|
| C1 | 300 pf |
| C2 | 0.1 µf |
| C3 | 1000 pf |
| C4 | 1000 pf |
| CR1 | Diode IN6628 |
| CR2 | Diode IN6628 |
| CR3 | Zener IN6037A |

Figure 3:
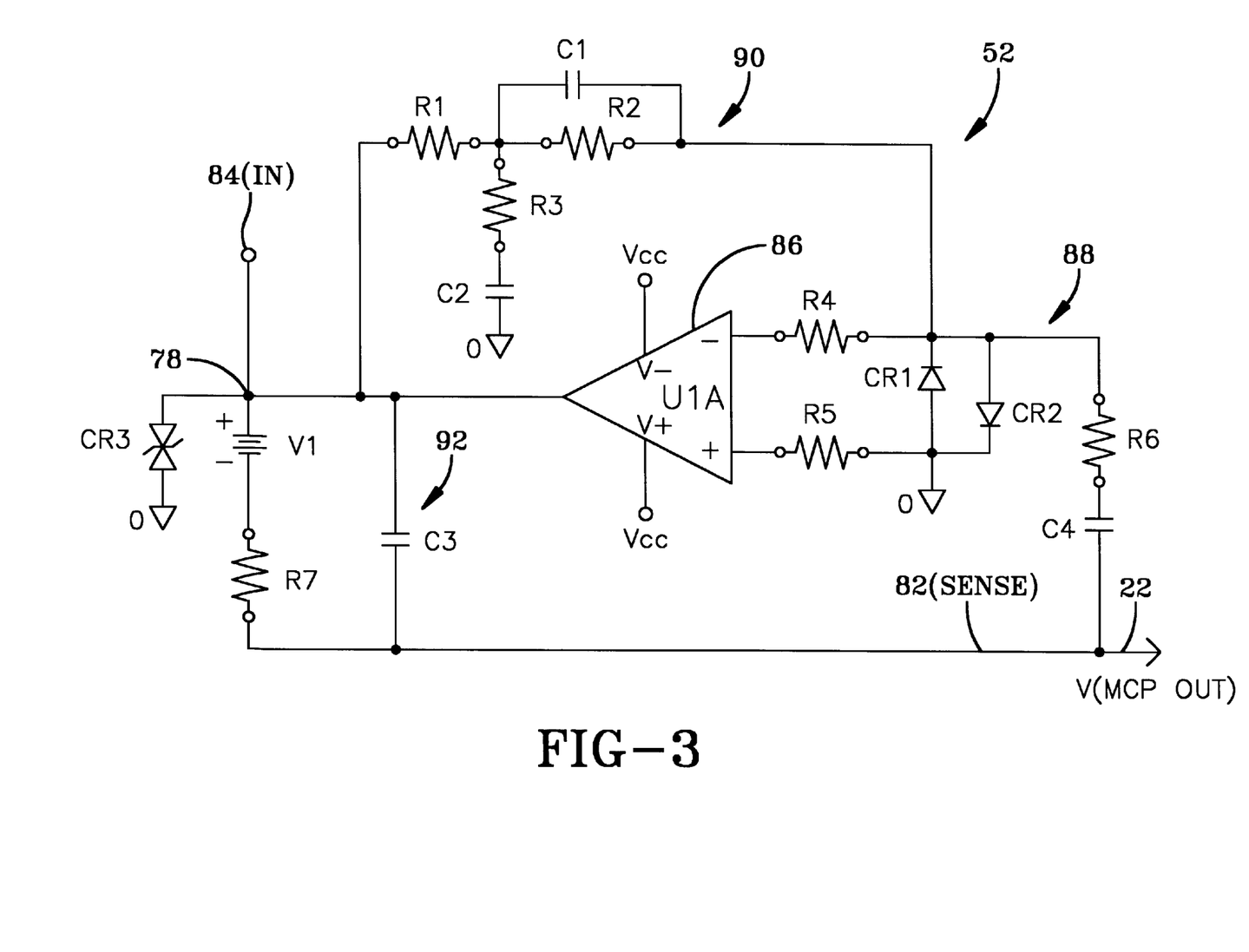
FIG. 3 is a schematic of the active regulator of the present invention.
Figure 4:
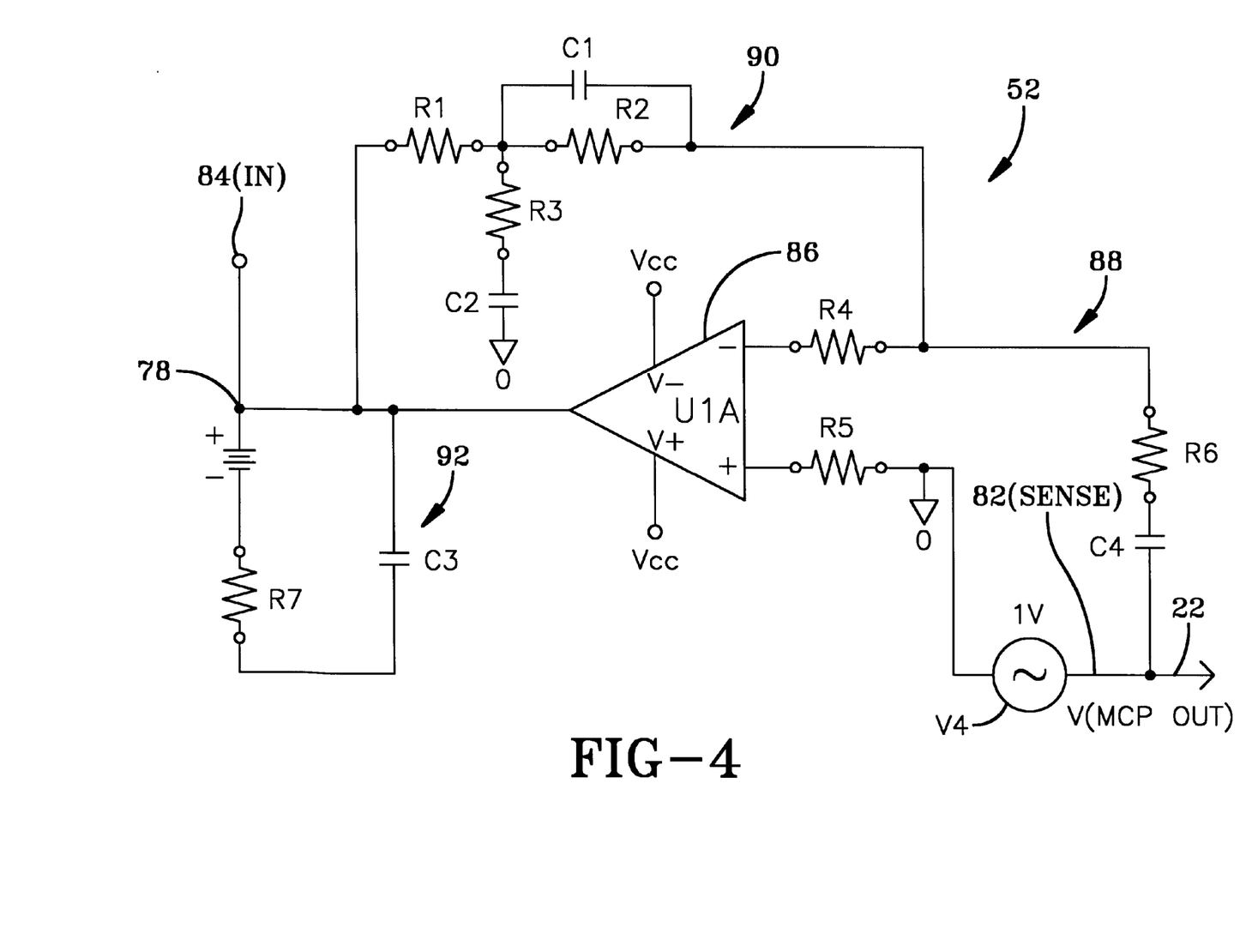
FIG. 4 is a schematic used for the analysis of the open loop frequency response of the active regulator of the present invention.

FIG. 3, as well as FIG. 4, illustrates the active regulator 52 as having its (in) 84 terminal connected to terminal 78 of the screen voltage multiplier 50 generally illustrated in FIGS. 3 and 4 as voltage source V1. Similarly, the active regulator 52 has its (sense) 84 terminal connected to the third terminal 22 of the MCP 18 of FIG. 1 and also indicated in FIGS. 3 and 4 as V (MCP OUT).

The active regulator of FIG. 3 comprises a differential means 86 having an inverting (−) and a non-inverting (+) input and an output which is connected to the terminal 78 of the source V1. The differential means 86 may be the operational amplifier U1A of Table 1, or it may be selected from the group consisting of another type operational amplifier and a wide band video operational amplifier. The differential means 86 is arranged as shown in FIG. 3.

The active regulator 52 further comprises an arrangement 88 having a first and second end comprised of a serial arrangement of a resistor R4, a resistor R6 and a capacitor C4 with one end of capacitor C4 being connected to the positive output of the positive voltage source (terminal 62 of the MCP voltage multiplier 46) that is present at terminal 22, and with one end of resistor R4 being connected to the inverting (−) input of the differential means 86.

The active regulator 52 further comprises a resistor R5 having first and second ends, with the first end connected to the non-inverting (+) input of the differential means 86 and the second end connected to both the other end of said resistor R4 and to a ground potential. However, as will be described, it is preferred that a poled pair of diodes CR1 and CR2 be interposed between resistors R4 and R5.

The active regulator 52 has a network 90 having a first and a second end, with the first end connected to the output of the differential means 86 and with the second end connected to the other end of the resistor R4. The network 90 comprises; a first resistor R1 having first and second ends with the first end thereof connected to the first end of the network; and a second resistor R2 having first and second ends with the first end thereof connected to the second end of resistor R1 and the second end thereof connected to the other end of the resistor R4.

The active regulator 52 has a serial arrangement of a capacitor C2, a resistor R3 and a capacitor C1 each having first and second ends, the first of capacitor C2 connected to a ground potential and its second end connected to the first end of resistor R3 which, in turn, has its second end connected to said first end of the capacitor C1 which, in turn, has its second end connected to the other end of the resistor R4.

The active regulator 52 further comprises a serial arrangement 92 comprising a resistor R7 and a capacitor C3 each having first and second ends. The resistor R7 has its first end thereof connected to the negative voltage of the voltage source V1, that is, the negative terminal of the voltage source V1. The resistor R7 has its second end connected to both the first end of the capacitor C3 and to the positive voltage of the positive voltage source, that is, to terminal 22. The second end of the capacitor C3 is connected to the output of the differential means 86.

The active regulator 52 preferably further comprises a zener diode CR3 having first and second ends with the first end connected to a ground potential and the second end connected to the output of the differential means 86. Still further, the active regulator preferably comprises the previously mentioned oppositely polled diodes CR1 and CR2 interposed between resistors R5 and R4 and having first and second ends, with the first end thereof connected to the second end of resistor R5 and the second end thereof connected to the other end of said resistor R4.

In FIG. 3, the voltage source V1 represents the screen supply, and the high voltage capacitor C3 is essentially the MCP OUT filter capacitor. The screen supply, that is, in actuality screen voltage multiplier 50 of FIG. 1, is usually implemented with a multi-stage voltage multiplier circuit which is driven by an ac sinewave source. The output of the voltage source V1 of FIG. 3 typically contains a ripple voltage component, previously referred to as ac component having an instantaneous amplitude and phase, at the sinewave frequency whose magnitude depends on capacitance value, frequency, load, and number of multiplication stages used in the implementation of the screen voltage multiplier 50.

Further, in FIG. 3, the positive side of the screen supply, that is voltage source V1, is connected to the output of operational amplifier U1A, representative of the differential means 86. The ac component of the MCP OUT voltage present on terminal 22, to which the sense 82 terminal is also connected, is sensed via capacitor C4, and applied to the (−) inverting input of operational amplifier U1A. The network 90 of FIG. 3 is used to provide frequency selective feedback. The non-inverting input of operational amplifier U1A is connected to ground via resistor R5.

At d-c, that is, the non-presence of an a.c. component on terminal 78 of the voltage source V1, all of the capacitors of FIG. 3 are effectively open circuits. No feedback signal is applied to the inverting input of the operational amplifier 86. For this condition, the circuit configuration of FIG. 3 is that of a non-inverting, unity gain, voltage follower with the feedback network consisting of resistors R1 and R2 in series. The ground reference voltage, that is, the voltage present on terminal 78 of the voltage source V1, is applied to the non-inverting input of the operational amplifier 86 which causes the output of the operational amplifier 86 to also be at ground potential. The positive side of the screen supply is, therefore, effectively tied to ground. More particularly, the positive side of V1 and, more importantly, the positive side (relative to the negative potential) of the screen voltage multiplier 50 is at ground potential. From a circuit standpoint this is identical to the standard implementation which affirmatively connects (not shown) the positive side of a screen supply, such as the screen voltage multiplier 50, directly to ground. From the above description, it can be concluded that the active regulator 52 does not affect the d-c operation of the high voltage power supply 28 of the present invention.

Conversely, in the operation of active regulator 52, as frequency increases, an increasingly larger portion of the ac signal is fed back from the MCP OUT terminal 22 to the inverting input of the operational amplifier 86, via a high pass network comprised of resistor R6 and capacitor C4. The non-inverting input to the operational amplifier 86 serves as a reference input and is at ground potential by way of resistor R5. The input difference signal, that is, the signal between the inverting and non-inverting inputs of the operational amplifier 86, is inverted and amplified by the operational amplifier 86. This signal is inserted by the operational amplifier in series with the screen supply voltage which is present on terminal 78 of the screen voltage multiplier 50 and effectively cancels out the ac component that would otherwise act as an ac error signal and may be present on terminal 22. From FIG. 3, it is seen that the output of the operational amplifier 86 is connected to terminal 22 by way of capacitor C3.

The equivalent circuit of active regulator 52 in its open-loop condition is shown in FIG. 4, wherein the ac noise present on terminal 22 is generally indicated by voltage source V4 having a typical value of 1.0 volts. The equation for the approximate open loop frequency response is given below.

$$\frac{V_{out}}{V_{in}} \cong \left[\frac{-sC4R2}{sC4R6+1}\right]\left[\frac{(sC1R3+1)(sC2R1+1)}{(sC1R2+1)(sC2R3+1)}\right] \quad (1)$$

The poles and zeros of the transfer function having the relationship of equation (1) are at the following frequencies as shown by expressions (2)–(7).

$$f0 = \frac{1}{(2\pi)C4R2} = (\text{zero at } d-c) \quad (2)$$

$$f1 = \frac{1}{(2\pi)C1R3} = 531 \text{ KHz (zero)} \quad (3)$$

$$f2 = \frac{1}{(2\pi)C2R1} = 175 \text{ Hz (zero)} \quad (4)$$

$$f3 = \frac{1}{(2\pi)C4R6} = 14.5 \text{ KHz (pole)} \quad (5)$$

$$f4 = \frac{1}{(2\pi)C1R2} = 5.3 \text{ KHz (pole)} \quad (6)$$

$$f5 = \frac{1}{(2\pi)C2R3} = 1.6 \text{ KHz (pole)} \quad (7)$$

Figure 5:
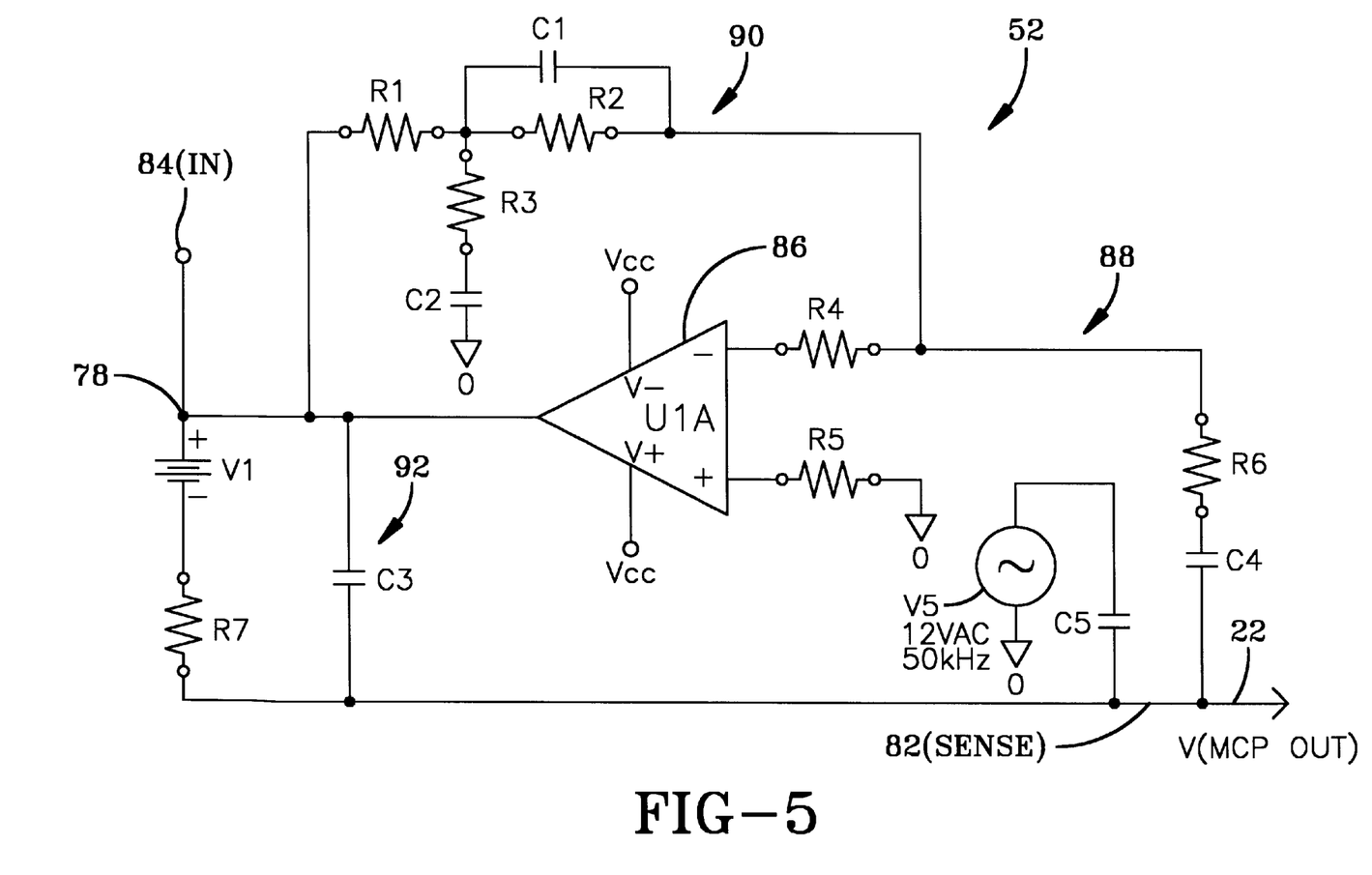
FIG. 5 illustrates the circuit of the active regulator used for the simulation of the present invention.

In the practice of the present invention, the implementation of the active regulator 52 was optimized by use of detail circuit analysis. A so called "Pspice circuit" simulation was then used to further analyze and verify the design. The circuit used in the closed-loop Pspice simulation of the active regulator 52 is shown in FIG. 5, wherein a voltage generator V5 is shown being a 50 Khz sinewave source which models the ripple, or ac component previously described, which appears at the MCP IN terminal, that is, terminal 20 of FIG. 1. This ac component is coupled to the MCP OUT terminal, that is terminal 22 of FIG. 5, via the MCP array capacitance, as shown in FIG. 1 by the plurality of capacitors C5, which is modeled by capacitor C5 of FIG. 5 having a typical value of 70 p.f.

Figure 6:
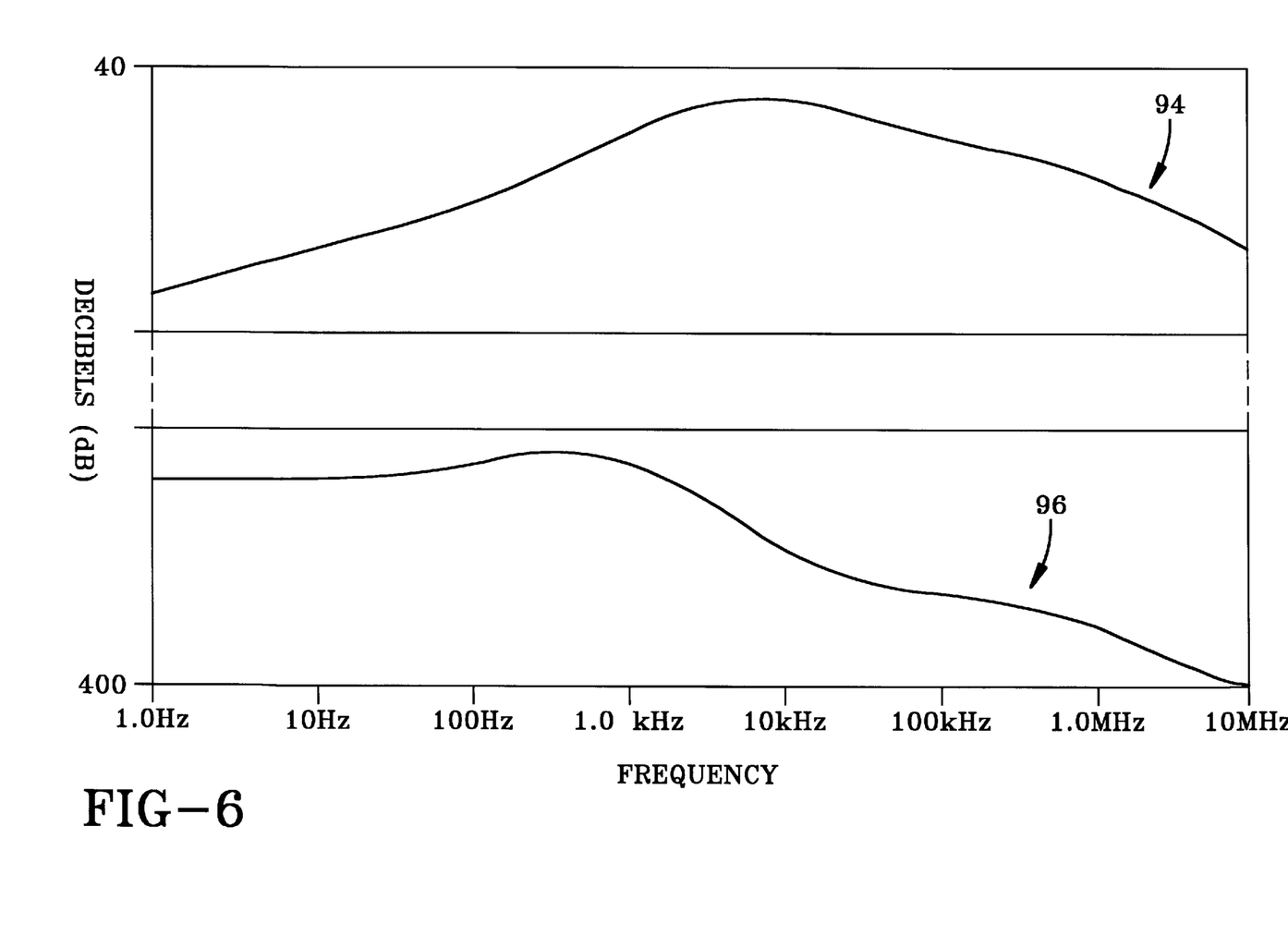

FIG. 6 has an X axis given in frequency and a Y axis given in dB and shows the open loop magnitude (plot 94) and phase (plot 96) versus frequency response (X axis) obtained by using the Pspice circuit simulation. The simulated response agrees essentially completely with the calculated results from equation 1. From a review of FIG. 6, it is seen that the magnitude response shows the –20 db/decade slope at low frequencies due to the zero at d-c represented by equation (2). The response breaks to –40 db/decade at 175 Hz due to the C2R1 zero represented by equation (4). The two poles at 1.6 and 5.3 KHz represented by equations (7) and (6) respectively, return the response to 0db/decade. The C4R6 pole at 14.5 khz represented by equation (5) causes the magnitude response to fall at a 20 db/decade rate. The magnitude response crosses zero db at 460 khz with a 77 degree phase margin. The zero at 531 khz and the operational amplifier 86 open-loop response are then encountered beyond the 0db gain crossing.

Figure 7A:
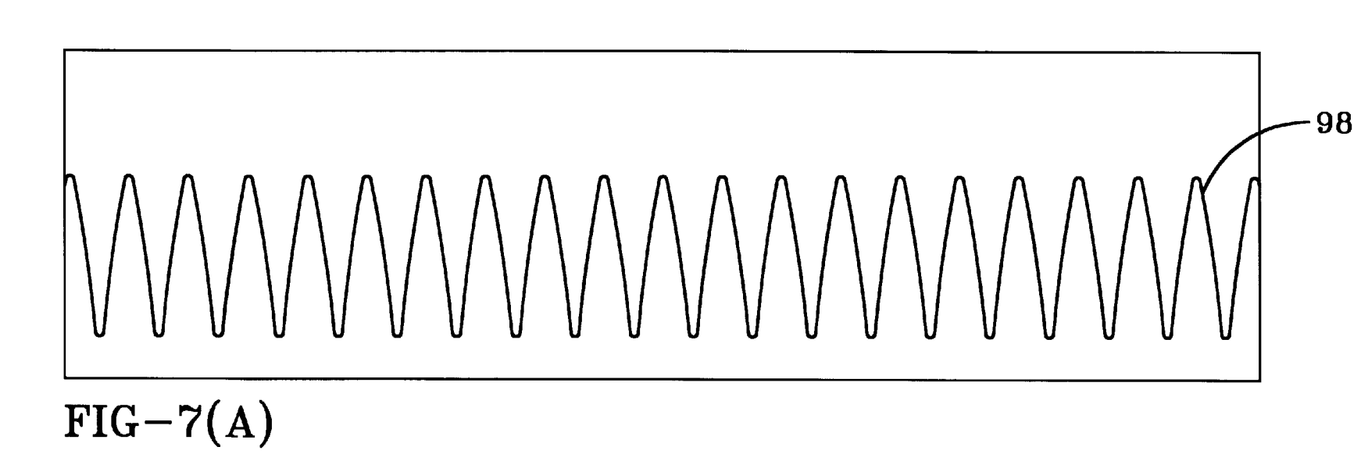
Figure 7B:
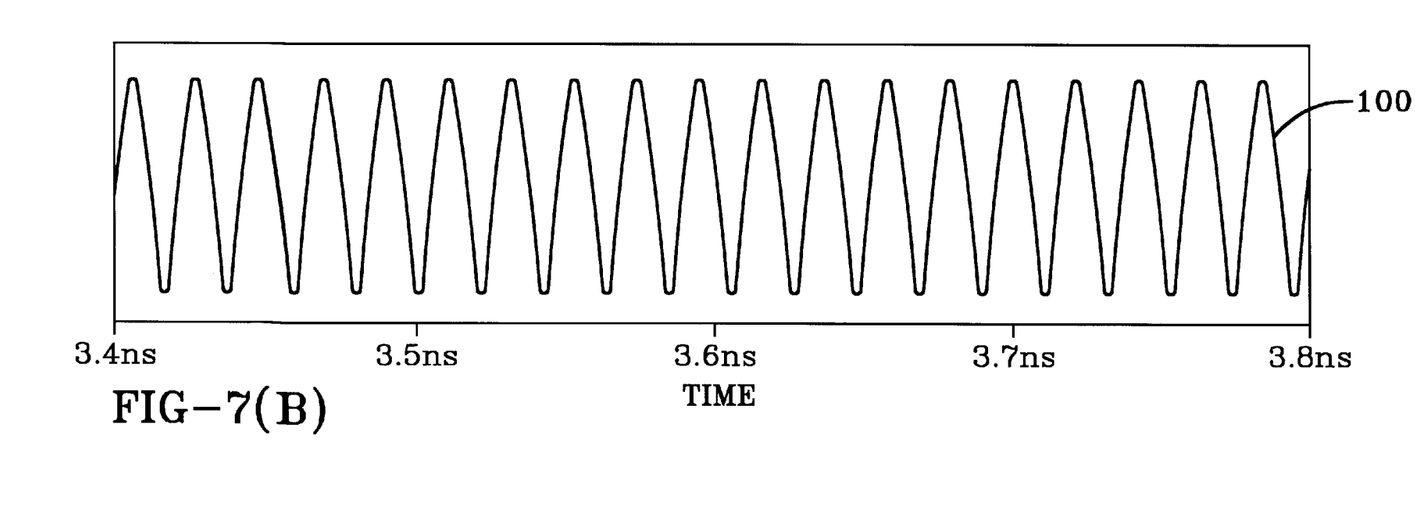

The results of a transient analysis simulation is shown in FIG. 7 composed of FIGS. 7(A) and 7(B). FIG. 7(A) shows about 180 mVolts of peak-to-peak ripple 98 at the MCP OUT terminal 22. The correction voltage 100 generated at the output of the operational amplifier 86 is shown in FIG. 7(B). This voltage of FIG. 7(B) is approximately 1.54 Volts peak-to-peak. The active regulator 52 has, therefore, reduced the output ripple by a factor of 8.5/1.

Figure 8A:
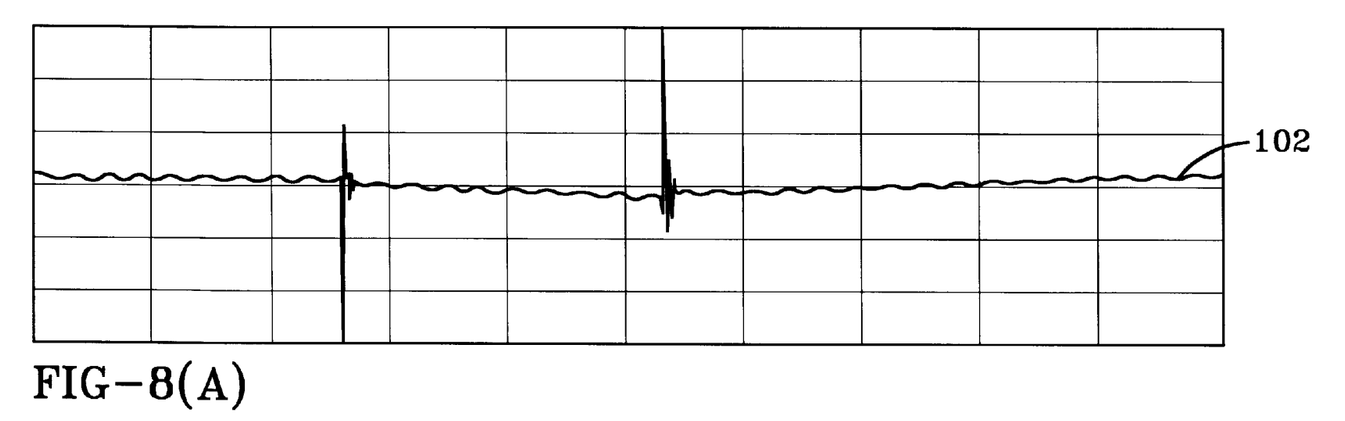
Figure 8B:
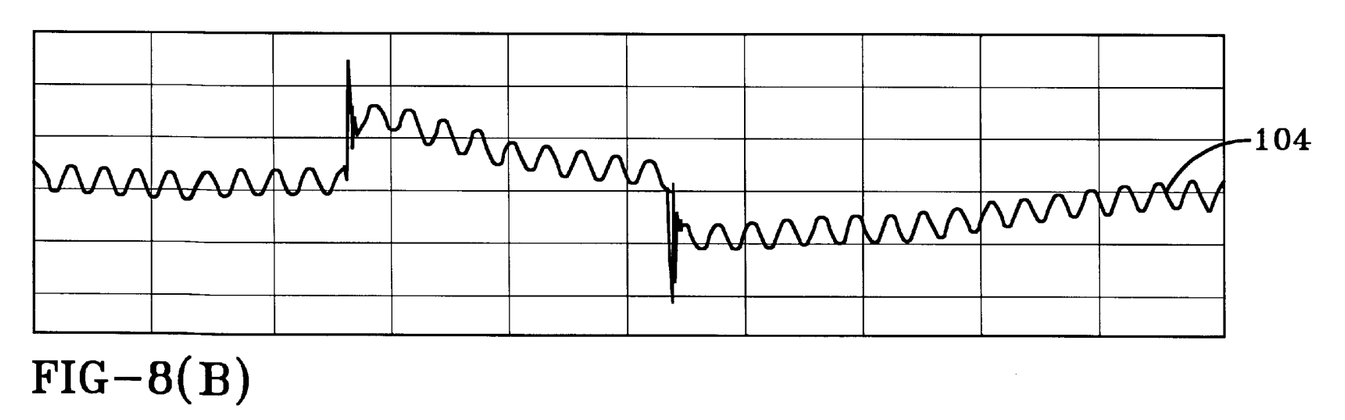
Figure 9A:
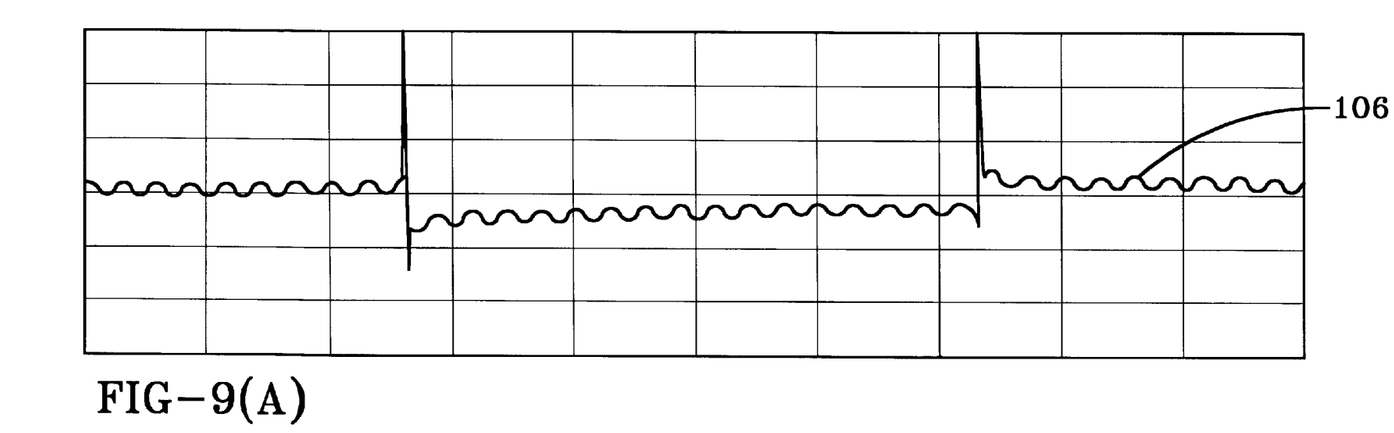
Figure 9B:
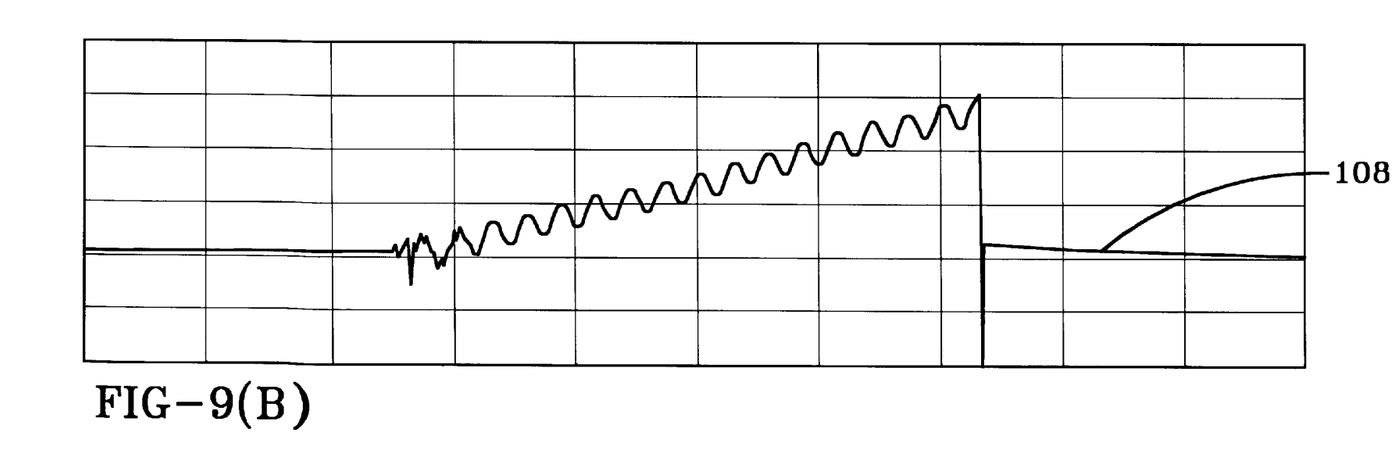
Figure 10A:
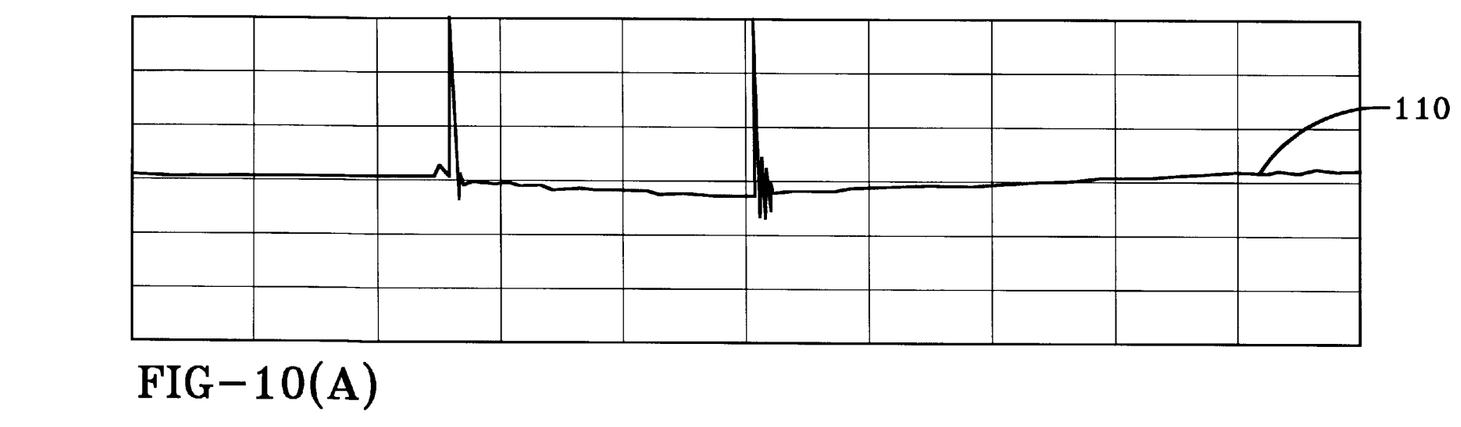
Figure 10B:
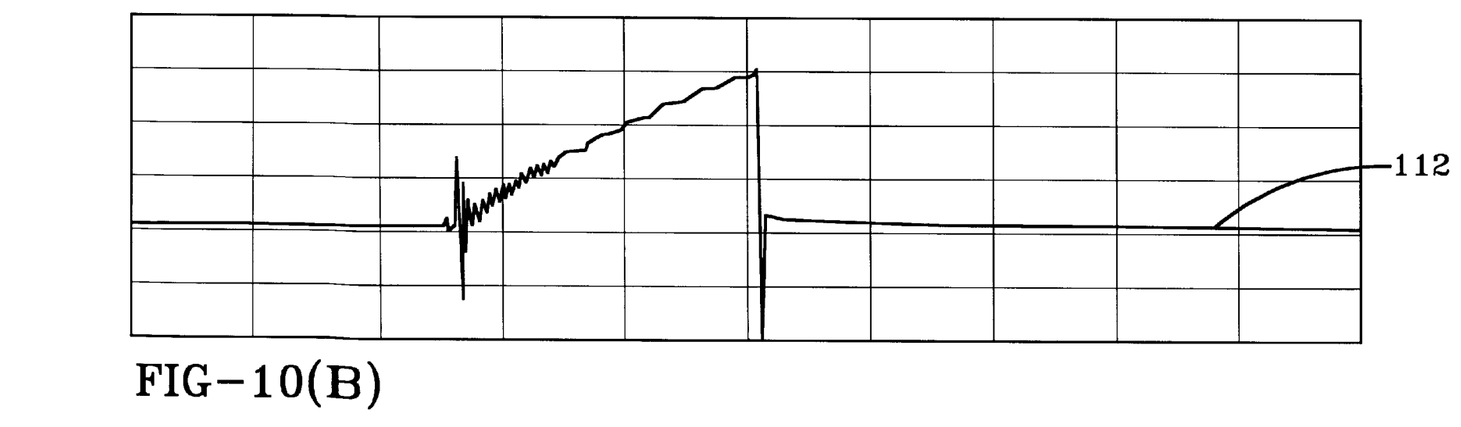

In a further practice of the present invention, a breadboard model of the active regulator 52 was constructed and incorporated into the high voltage power supply brassboard. FIG. 8, composed of FIGS. 8(A) and 8(B), shows the MCP OUT voltage as plot 102 of FIG. 8(A), and the correction amplifier output voltage as plot 104 of FIG. 8(B) when the active regulator is utilized. A uniformly illuminated image intensifier tube was then connected to the high voltage power supply 28. The MCP OUT voltage and integrator waveform are shown in FIG. 9, composed of FIGS. 9(A) having plot 106 and 9(B) having plot 108 for the basic IIT/HVPS system without the active regulator. In contrast to FIG. 8, FIG. 10 composed of FIGS. 10(A) and 10(B) having plots 110 and 112 shows the same waveforms when the active regulator 52 in accordance with the practice of the present invention is added. It is noted that the active regulator 52 also removes much of the cathode switch feedthrough voltage step.

In a still further practice of the present invention an IIT 12 was employed so the cathode switch voltage amplitude was approximately 900 volts. In such use, the active regulator 52 greatly reduced the ac noise at the MCP OUT terminal 22 which makes possible a much more sensitive and much more accurate integration of the screen current. This, in turn, makes it feasible to operate at much lower output screen brightness levels.

Since this circuit operates as part of a high voltage network 28, it is necessary to provide overvoltage protection for the low voltage components. Referring to FIG. 3, clamp diodes CR1 and CR2 protect the input of the operational amplifier 86. The output of the operational amplifier 86 is protected by the bi-directional TransZorb device CR3. Further, it is desired that resistor R6 be a high voltage type capable of withstanding the MCP OUT voltage during the turn "on" transient.

It should now be appreciated that the present invention provides an active regulator 52 to reduce MCP OUT voltage noise. The ground lead to the screen supply is effectively opened, and an active regulator 52 is inserted between the screen supply and ground. The active regulator 52 senses the ac component of the MCP OUT voltage. The complement of the sensed voltage is then generated and added to the screen voltage, thereby, effectively nulling or cancelling out the ac noise voltage. The invention, therefore, results in greatly reduced MCP OUT voltage noise while having minimum affect on the physical size and stored charge.

It should be further appreciated that the active regulator 52 of FIG. 3 may be altered without effecting its fundamental configuration. Some samples are: substitution of other operational amplifier types for the differential means 86 of FIG. 3, use of other feedback network types, and use of different protection (diode) arrangements. One alternate implementation is to use a very wide band video operational amplifier which allows for the feedback network to be altered so as to provide greater open loop gain at the ripple or ac component frequency, thereby, resulting in improved noise rejection. The use of the wide band amplifier would, however, result in significantly higher power consumption.

Many modifications or variations of the present invention are possible in view of the above disclosure. It is, therefore, to be understood, that within the scope of the appended claims, the invention may be practiced otherwise as specifically described.

What I claim is:

1. A vision system comprising:
   (a) an image intensifier tube having four terminals and comprising:
      (i) a photocathode having a first terminal at one of its ends;
      (ii) a micro channel plate having second and third terminals at one of its ends; and
      (iii) an anode having a fourth terminal at one of its ends; and
   (b) a high voltage power supply comprising:
      (i) a cathode switch having a common and a control terminal, said common having one end connected to said first terminal and its other end switchable between ON and OFF positions in response to a first electrical signal applied at said control terminal;
      (ii) a cathode supply comprising a positive power source and a negative power source each having positive and negative terminals with the positive terminal of the positive power source connected to the OFF position of the cathode switch and the negative terminal of the negative power source connected to the ON position of the cathode switch, said negative terminal of said positive power source being connected to both said positive terminal of said negative power source and said second terminal of said micro channel plate;
      (iii) a micro channel plate voltage multiplier having positive, negative and adjustable terminals and developing a voltage having a variable d-c value and an ac ripple component having an instantaneous amplitude and phase between its positive and negative terminals in response to a second electrical signal applied to said adjustable terminal, said negative terminal thereof being connected to said second terminal of the micro channel plate and said positive terminal thereof being connected to said third terminal of said micro channel plate;
      (iv) an exposure control circuit having control (cont), micro channel plate (MCP), gate and input (in) terminals, said (cont) terminal thereof connected to said control terminal of said cathode switch, said (MCP) terminal thereof connected to said adjustable terminal of said micro channel plate voltage multiplier and said (in) terminal thereof connected to said fourth terminal of said anode, said exposure control circuit being responsive to an electrical signal applied on its gate terminal and, in response therefore, generating said first and second electrical signals;
      (v) a screen voltage multiplier developing a negative voltage at one of its terminals connected to the third terminal of the micro channel plate, said screen voltage multiplier having a ground terminal as another one of its terminals; and
      (vi) an active regulator having a terminal connected to said ground potential, a sense terminal connected to said third terminal of said micro channel plate, and input (in) terminal connected to said ground potential terminal of said screen voltage multiplier, said active regulator sensing said ac component of said micro channel plate voltage multiplier having an instantaneous amplitude and at an instantaneous phase thereof and generating a signal having corresponding amplitude but at an opposite phase thereto so as to effectively cancel said ac component of said micro channel plate voltage multiplier.

2. A regulator for adjusting the voltage developed by the combination of a positive voltage source having a positive output with a variable d-c value and an a.c. ripple component having an instantaneous amplitude and at a phase and a negative voltage source having a negative voltage and connected to said positive output and a ground terminal, said regulator comprising;
   a terminal connected to a ground potential, a sense terminal connected to said positive output, and an input (in) terminal connected to said ground terminal of said negative voltage source, said active regulator having its sense terminal connected to sense said ac component of said positive voltage source and generating a signal having a corresponding amplitude but at an opposite phase thereto so as to effectively cancel said ac component of said positive voltage source.

3. The regulator according to claim 2, wherein said negative voltage source has a second output which is a positive voltage and said regulator comprises:
   (a) a differential means having an inverting and a non-inverting input and an output which is connected to said ground terminal of said negative voltage source;
   (b) an arrangement having a first and second end comprised of a serial arrangement of a resistor R4, a resistor R6 and a capacitor C4, with one end of capacitor C4 serving as said sense terminal and connected to said positive output of said positive voltage source and with one end of resistor R4 connected to the inverting input of said differential means;
   (c) a resistor R5 having first and second ends with the first end connected to the non-inverting input of said differential means and the second end connected to both the other end of said resistor R4 and to a ground potential;
   (d) a network having a first and a second end with the first end connected to the output of said differential means and with the second end connected to said other end of said resistor R4, said network comprising:
      (i) a first resistor R1 having first and second ends with the first end thereof connected to said first end of said network;
      (ii) a second resistor R2 having first and second ends with the first end thereof connected to the second end of resistor R1 and the second end thereof connected to said other end of said resistor R4;
      (iii) a serial arrangement of a capacitor C2, a resistor R3 and a capacitor C1 each having first and second ends, said first end of capacitor C2 connected to a ground potential and its second end connected to the first end of resistor R3 having its second end connected to said first end of said capacitor C1, said capacitor C1 having its second end connected to said other end of said resistor R4; and
   (e) a serial arrangement of a resistor R7 and a capacitor C3 each having first and second ends, said resistor R7 having its first end thereof connected to said negative voltage of said negative voltage source and its second end thereof connected to both the first end of said capacitor C3 and to said positive voltage of said positive voltage source, and said second end of said capacitor C3 being connected to said output of said differential means.

4. The regulator according to claim 3 further comprising a zener diode CR3 having first and second ends with the first end connected to a ground potential and the second end connected to said output of said differential means.

5. The regulator according to claim 3 further comprising oppositely polled diodes CR1 and CR2 interposed between resistors R5 and R4 and having first and second ends with the first end thereof connected to said second end of resistor R5 and the second end thereof connected to said other end of said resistor R4.

6. The regulator according to claim 3, wherein said differential means is selected from the group consisting of an operational amplifier and wideband video operation amplifier.

* * * * *